United States Patent [19]

Lones

[11] 4,135,228
[45] Jan. 16, 1979

[54] UNDERWATER ILLUMINATION DEVICE

[76] Inventor: Joe J. Lones, P.O. Box 6313, San Diego, Calif. 92106

[21] Appl. No.: 761,023

[22] Filed: Jan. 21, 1977

[51] Int. Cl.² .................. G03B 15/02; H05B 33/02; F21V 7/09
[52] U.S. Cl. .................................. 362/18; 362/223; 362/297; 362/307
[58] Field of Search ............ 240/41.36, 41.3, 41.35 C, 240/26, 1.3, 103 R; 362/3, 16, 215, 297, 299, 310, 346, 348, 363, 218, 17, 18, 223, 257, 307

[56] References Cited

U.S. PATENT DOCUMENTS

| | | | |
|---|---|---|---|
| 1,357,034 | 10/1920 | D'Humy | 240/41.36 |
| 2,253,443 | 8/1941 | Muller | 362/348 |
| 2,542,311 | 2/1951 | Carlson | 240/1.3 |
| 3,508,040 | 4/1970 | Bertrams | 240/1.3 |
| 3,758,770 | 9/1973 | Morasz | 240/103 R |
| 4,021,660 | 5/1977 | Szpur | 362/218 |

FOREIGN PATENT DOCUMENTS 95277 2/1963 Denmark.

Primary Examiner—Donovan F. Duggan
Assistant Examiner—Peter S. Wong
Attorney, Agent, or Firm—Sughrue, Rothwell, Mion, Zinn and Macpeak

[57] ABSTRACT

An underwater illumination device comprises a base with a plug for a power source. A lamp on the base is enveloped by a tubular, transparent sleeve, with a cap at its outer end. A flux control reflector within the sleeve has a base and side plates, each provided with fluted surfaces serving to concentrate the light flux from the bulb and to direct the flux such that it flows to the outer edges of the beam to thereby more evenly illuminate an underwater object.

6 Claims, 7 Drawing Figures

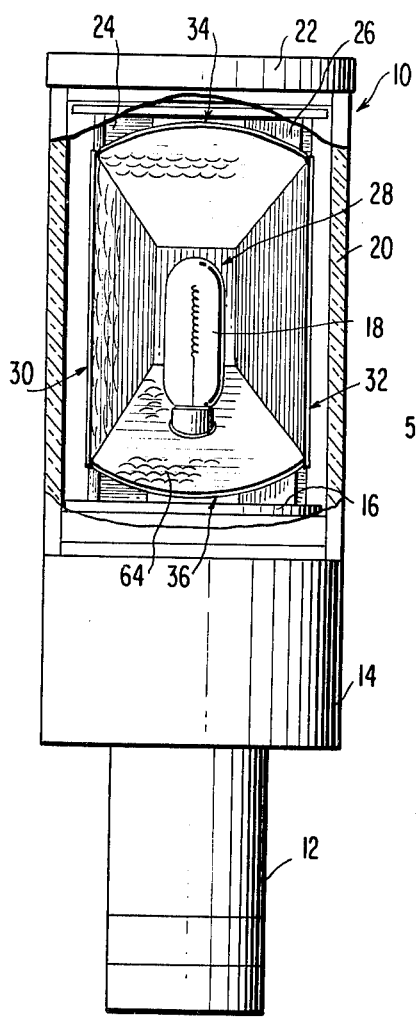
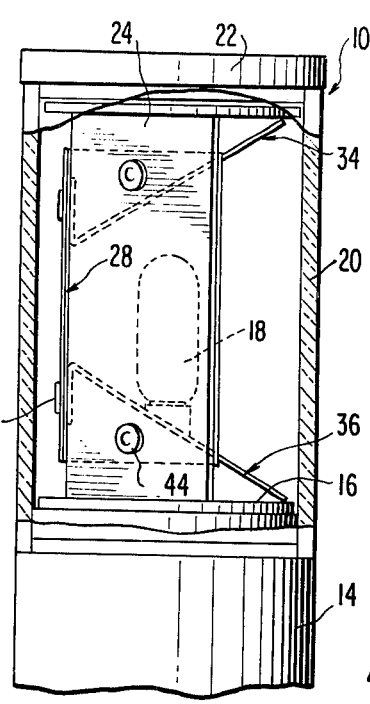
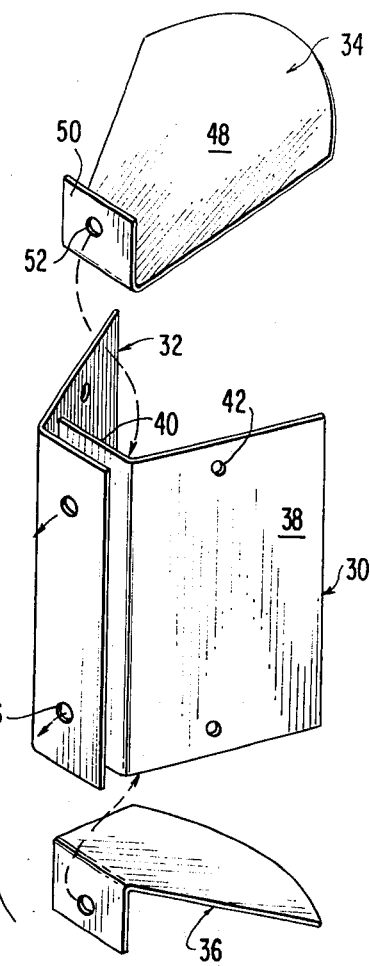
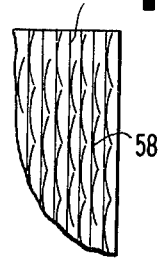
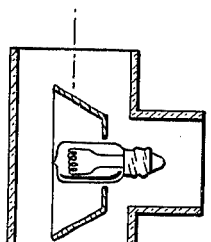
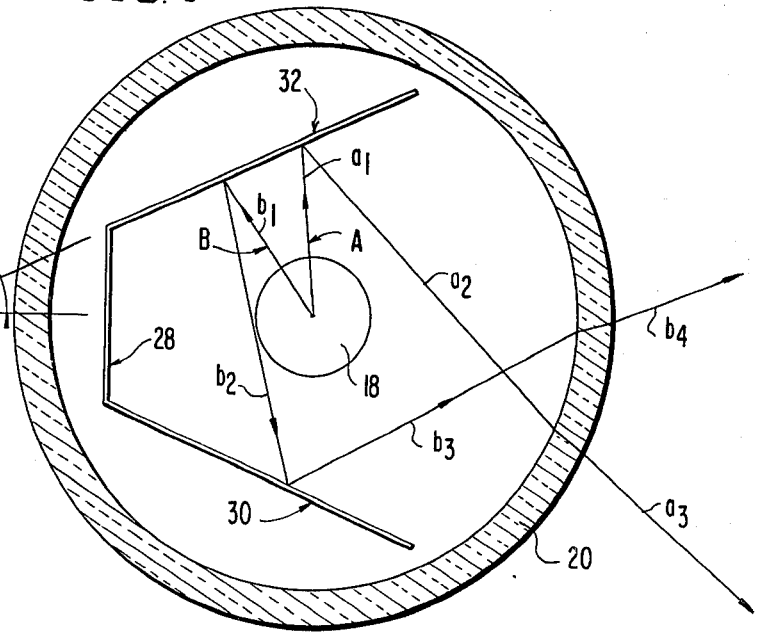
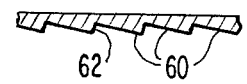

UNDERWATER ILLUMINATION DEVICE

BACKGROUND OF THE INVENTION

1. Field of the Invention

This invention pertains to an underwater illumination device and more particularly to a light source adapted to produce a beam having a light density pattern meeting the requirements of underwater photography.

2. Statement of the Prior Art

Underwater lights for photography have been previously employed wherein a bulb has a transparent sleeve thereabout, and a curvilinear reflector is disposed behind the bulb.

SUMMARY OF THE INVENTION

The underwater illumination device herein disclosed includes a lamp mounted to illuminate through a curved envelope which excludes the surrounding liquid media. Flux from the rear of the lamp is directed by a specular reflector such that it flows to the outer edges of the light beam. The reflector has a fluted pattern on its reflective surfaces providing an added degree of control on the beam flux density distribution. The matching of the fluted specular reflector with a curved envelope as described has been found to uniquely increase the beam flux at the solid angle comprising the outer edges of the beam.

In underwater photography, the utilization of light sources is required due to ambient conditions. It is important, due to energy and size limitations and absorptions and scattering of flux in a liquid media, to maximize the efficiency of underwater lights, and to control the pattern of the light emitted therefrom so that the object to be photographed is illuminated without scattering light to adjacent areas. To this objective, the present invention provides a reflector which, in combination with a curved envelope concentrates the flux from the source and avoids light loss.

Other and further objects and advantages of this invention will become apparent to those skilled in the art from a consideration of the following specification when read in conjunction with the annexed drawing.

BRIEF DESCRIPTION OF THE DRAWING

FIG. 1 is a front elevational view of an underwater illumination device, partially broken away, according to this invention;

FIG. 2 is a fragmentary side elevation again partially broken away for disclosure of details;

FIG. 3 is a disassembled perspective view of the reflector hereof;

FIG. 4 is a schematic top view on enlarged scale, showing typical light ray patterns;

FIG. 5 is an enlarged plan view of a portion of one of the reflective surfaces;

FIG. 6 is a further enlarged typical cross section through a panel of the type shown in FIG. 5; and FIG. 7 is a sectional view showing a modified form of the invention.

DESCRIPTION OF THE PREFERRED EMBODIMENT

Referring to the drawing in more specific detail, an underwater illumination device hereof is shown in a preferred embodiment in FIG. 1, and is there identified by reference character 10. The device 10 includes a power source plug base 12 provided with a suitable attachment means (not shown) for operatively associating it with a battery or other energy source. Immediately above the plug base 12 is a body 14 on which a socket member is mounted. The socket member is adapted in conventional fashion to receive a high intensity light bulb 18. The bulb 18 comprises the light source of this device. A transparent tubular sleeve 20 is sealingly mounted against the body 14 and projects outwardly therefrom about the bulb 18. A cap 22 provides a moisture excluding seal at the outer extremity of the transparent sleeve, and is suitably mounted thereat.

Within the sleeve, and mounted on the socket member 16, are bracket plates 24 and 26, arranged in selected, spaced apart angular relationship to one another.

The flux control reflector assembly hereof comprises a reflector base 28, side reflector plates 30 and 32, and end plates 34 and 36. The side plates each comprise a side plate panel 38 and an integral base forming plate 40. The side panels have mounting apertures 42 formed therein, and these are aligned in the assembled units, with holes in the bracket plates 24 and 26 — when so aligned rivets 44 being employed outside the reflective area to lock them in place.

When the side panels 38 are affixed to the bracket plates, the respective base forming plates 40 are superimposed over one another in the central area of the reflector base 28. The plates 40 have openings 46 therein which are co-aligned in the superimposed positions. The superimposed plates 40 form the reflector base 28.

The end plates 34 and 36 each have a main end panel 48, and a bottom panel 50. The bottom panels 50 have holes 52 therein. Assembly of the unit involves alignment of the holes 52 with the openings 46 of the plates 40, and the securing of rivets 54 (FIG. 2) outside the reflector area, thereby locking the unit in assembled condition.

An important feature of this invention resides in the form and arrangement of the reflective surfaces of the base and side reflectors. As best shown in FIGS. 5 and 6, fluting is applied to the reflective surfaces 56 of the side reflector plate panels 38 and base panels 40. Such fluting comprises a recurring pattern of impressed, embossed or otherwise formed wavy lines 58 which define flat main reflective surfaces 60, with abbreviated intermediate steps 62.

FIG. 4 schematically illustrates the paths of two typical light rays A and B from the bulb source 18. Ray A first emits in a straight path $a_1$ and strikes the reflective surfaces 56 of the panel 32, being reflected in path $a_2$ to the curved lens formed by the sleeve 20. It is deflected by the lens to occupy path $a_3$ as it travels to the object to be illuminated. Ray B is emitted in path $b_1$ to the panel 32, being reflected therefrom in path $b_2$ to the reflective surface of the panel 30 from which it is reflected in path $b_3$ to the sleeve. At the sleeve it is deflected to path $b_4$ into the desired flux.

As further shown in FIG. 4, the optimum angle of relation of the side reflector plates 30 and 32 to the base reflector 28 is 24.25 degrees, when the reflective surfaces 60 are formed at an angle of five degrees with the plane of said reflector plates and in a direction to make the reflective surfaces 60 substantially perpendicular to the reflector 28. The fluting of the side and base reflectors is, as indicated above, an important feature hereof. The reflection from the end plates is of lesser importance, but these are also preferably provided with a diffuse pattern 64 on the reflective surfaces thereof.

It is to be noted (FIG. 1) that the main lengthwise extent of the lamp filament is substantially parallel to the extent of the surface 60. In FIG. 7, a modification is shown wherein, with those bulbs having a differently oriented filament, the bulb extends through an opening in reflector base to thereby accomplish this relationship.

I claim:

1. In an underwater light source assembly for photography, the combination, with a power source plug base, a bulb operatively connected on said base, a transparent tubular sleeve fixed to said base about said bulb, and a cap on said sleeve, of a flux control reflector comprising:

A planar reflector base having a specular reflective surface disposed in a first plane relative to the bulb;

planar side reflector plates with specular reflective surfaces angularly related in second and third planes relative to the bulb;

said second and third planes being substantially equal and opposite with respect to the plane of the base; and each of said surfaces of said reflective base and side reflector plates having a series of flutes thereon, each flute having a main reflective surface and a step surface, the flutes being arranged in recurring pattern throughout substantially the entire surface.

2. The invention of claim 1, and:

planar end plates for the reflector base, arranged angularly with respect thereto.

3. The invention of claim 1, wherein:

the main reflective surfaces of the flutes are oriented to vary the angle of reflection of light rays emitted by the light source from that of the side reflector plates to concentrate the rays toward the edges of the beam formed by the light rays.

4. In an underwater light source assembly for photography, the combination, with a power source plug base, a bulb operatively connected on said base, a transparent tubular sleeve fixed to said base about said bulb, and a cap on said sleeve, of a flux control reflector comprising:

a planar reflector base having a specular reflective surface disposed in a first plane relative to the bulb;

planar side reflector plates with specular reflective surfaces angularly related in second and third planes relative to the bulb; said second and third planes being substantially equal and opposite with respect to the plane of the base; each of said surfaces of said reflective base and side reflector plates having a series of flutes thereon, each flute having a main reflective surface and a step surface, the flutes being arranged in recurring pattern throughout substantially the entire surface; and the side reflector plates being disposed at angles of substantially 25 degrees relative to a plane perpendicular to the reflector base, and said main reflective surface of each flute on a side reflector plate forming an angle of substantially 5 degrees to the plane of the side reflector plate.

5. In an underwater light source assembly for photography, the combination, with a power source plug base, a bulb operatively connected on said base, a transparent tubular sleeve fixed to said base about said bulb, and a cap on said sleeve, of a flux control reflector comprising:

A reflector base having a reflective surface disposed in the first plane relative to the bulb;

side reflector plates with reflective surfaces angularly related in second and third planes relative to the bulb;

said second and third planes being substantially equal and opposite with respect to the plane of the base;

each of said surfaces of said reflective base and side reflector plates having a series of flutes thereon, each flute having a main reflective surface and a step surface, the flutes being arranged in recurring pattern throughout substantially the entire surface; and the reflector base being constructed of overlapped panels extended from the side reflector plates.

6. The invention of claim 1, wherein:

said flutes are embossed into the surfaces and are of varied widths in recurring pattern.

* * * * *